US008641978B2

(12) United States Patent
Elkin et al.

(10) Patent No.: US 8,641,978 B2
(45) Date of Patent: *Feb. 4, 2014

(54) POWER SUPPLY INCLUDING TRANSFORMER-LESS HIGH VOLTAGE POWER OSCILLATORS FOR OZONE GENERATION (75) Inventors: Igor Elkin, Malden, MA (US); Alan Millner, Lexington, MA (US); Ken Tran, North Chelmsford, MA (US); Madhuwanti Joshi, Edison, NJ (US)

(73) Assignee: MKS Instruments, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,580

(22) Filed: Jun. 20, 2012

(65) Prior Publication Data
US 2013/0156648 A1    Jun. 20, 2013

Related U.S. Application Data

(63) Continuation of application No. 11/503,662, filed on Aug. 14, 2006, now Pat. No. 8,226,900.

(60) Provisional application No. 60/708,445, filed on Aug. 16, 2005.

(51) Int. Cl.
*B01J 19/08* (2006.01)

(52) U.S. Cl.
USPC .................................................. 422/186.07

(58) Field of Classification Search
USPC ........................................ 422/186.15, 186.07
See application file for complete search history.

(56) References Cited

U.S. PATENT DOCUMENTS

| | | | |
|---|---|---|---|
| 4,790,980 A | 12/1988 | Erni et al. | |
| 5,135,725 A * | 8/1992 | Hendrickson et al. ... | 422/186.15 |
| 5,285,372 A | 2/1994 | Hynh et al. | |
| 5,332,556 A | 7/1994 | Coakley et al. | |
| 6,469,921 B2 | 10/2002 | Arai et al. | |
| 2002/0127989 A1 | 9/2002 | Yonekura | |
| 2002/0145478 A1 | 10/2002 | Chang | |

(Continued)

FOREIGN PATENT DOCUMENTS

| | | |
|---|---|---|
| JP | S57-156680 | 9/1982 |
| JP | H04-006789 | 1/1992 |

(Continued)

OTHER PUBLICATIONS

Akbari, A. et al., "Efficient Ozone Generator Using Full-Bridge Inverter and its Performance Evaluations," *The Fifth International Conference*, vol. 2, pp. 1182-1187 (2003).

(Continued)

*Primary Examiner* — Kishor Mayekar
(74) *Attorney, Agent, or Firm* — Proskauer Rose LLP (57) ABSTRACT

A transformer-less power supply is provided for ozone generation. The power supply advantageously reduces costs and increases reliability of ozone generators. The power supply provides a first AC voltage from a power source to a resonant circuit and the resonant circuit provides a second AC voltage to the ozone generating unit, the second AC voltage being greater than the first AC voltage. A controller for the power supply that adapts to the resonance of the circuit to provide control with a wide tolerance for the high Q circuit component values of the circuit.

20 Claims, 9 Drawing Sheets

(56) References Cited

U.S. PATENT DOCUMENTS

| | | |
|---|---|---|
| 2003/0067359 A1 | 4/2003 | Darabi et al. |
| 2003/0132810 A1 | 7/2003 | Moindron |
| 2006/0205374 A1 | 9/2006 | Darabi et al. |

FOREIGN PATENT DOCUMENTS

| | | |
|---|---|---|
| JP | H09-002806 | 1/1997 |
| JP | 11-288796 | 10/1999 |
| JP | 11-288796 A | 10/1999 |
| JP | 2001-178141 | 6/2001 |
| JP | 2002-171765 | 6/2002 |
| JP | 2003-125586 | 4/2003 |
| JP | 2003-230380 | 8/2003 |
| WO | WO 01/47324 A1 | 6/2001 |

OTHER PUBLICATIONS

Alonso, J.M. et al., Analysis and Design of a Novel Single-Stage High-Power-Factor Electronic Ballast Based on Integrated Buck Half-Bridge Resonant Inverter, *IEEE Transactions on Power Electronics*, vol. 19, No. 2, pp. 550-559 (2004).

Alonso, J.M. et al,, "Analysis, Design and Experimentation of a High Voltage Power Supply for Ozone Generation Based on the Current-Fed Parallel-Resonant Push-Pull Inverter," *IAS*, pp. 2687-2693 (2004).

Alonso, J.M. et al., "Analysis, Design, and Optimization of the LCC Resonant Inverter as High-Intensity Discharge Lamp Ballast," *IEEE Transactions on Power Electronics*, vol. 13, No. 3, pp. 573-585 (1998).

Alonso, J.M. et al., "Low-Power High-Voltage High-Frequency Power Supply for Ozone Generation," *IEEE Transactions on Industry Applications*, vol. 40, No. 2, pp. 414-421 (2004).

Alonso, J.M, et al., "Using Current-Fed Parallel-Resonant Inverters for Electro-Discharge Applications: A Case of Study," *Applied Power Electronics Conference and Exposition. APEC '04. Nineteenth Annual IEEE*, vol. 1, pp. 109-115 (2004).

Ben-Yaakov, S. et al., "A Self-Adjusting Sinusoidal Power Source Suitable for Driving Capacitive Loads," *Power Electronics, IEEE Transactions*, vol. 21, Issue 4, pp. 890-898 (2006).

Buranov, S.N. et al., "Wide-Range Medical Ozonator with Precise Low-Concentration Ozone Generation," *Pulsed Power Conference, Digest of Technical Papers. 12th IEEE International*, vol. 2, pp. 1421-1424 (1999).

Calleja, A.J. et al., "Analysis and Experimental Results of a Single-Stage High-Power-Factor Electronic Ballast Based on Flyback Converter," *IEEE Transactions on Power Electronics*, vol. 14, No. 6, pp. 998-1006 (1999).

Calleja, A.J. et al., "Design and Experimental Results of an Input-Current-Shaper Based Electronic Ballast," *IEEE Transactions on Power Electronics*, vol. 18, No. 2, pp. 547-557 (2003).

Chang, C. et al., "Analysis of the Self-Oscillating Series Resonant Inverter for Electronic Ballasts," *IEEE Transactions on Power Electronics*, vol. 14, No. 3, pp. 533-540 (1999).

Changsheng, H. et al., "A Closed-loop Control for the Power Source of the Ozonizer," $35^{th}$ *Annual IEEE Power Electronics Specialists Conference*, Aachen, Germany, pp. 3984-3987 (2004).

Correa, J. et al., "A Comparison of LCC and LC Filters for its Application in Electronic Ballast for Metal-Halide Lamps," *Power Electronics Specialists Conference. PESC. IEEE 32 Annual*, vol. 1, pp. 114-119 (2001).

Feng, Y.L. et al., "Next Generation Current-Source Soft-Switched PDM and PWM Hybrid Mode Inverter for Silent Discharge Ozone Generating Tube Drive," *Power Electronics and Motion Control Conference. Proceedings. IPEMC 2000. Third International*, vol. 1, pp. 312-317 (2000).

Fernández, O. et al., "MKP Capacitors for DC-Link Application in Modern Converters."

Gomes de Freitas, L.C. et al., "A New Proposal of a Switched Power Oscillator with Soft-commutation Applied as a HPF Electronic Ballast," *Applied Power Electronics Conference and Exposition. APEC '04. Nineteenth Annual IEEE*, vol. 1, pp. 143-148 (2004).

Jang, Y. et al., "New Two-Inductor Boost Converter with Auxiliary Transformer," *IEEE Transactions on Power Electronics*, vol. 19, Issue 1, pp. 169-175 (2004).

Kazimierczuk, M.K. et al., "Current-Source Parallel-Resonant DC/AC Inverter with Transformer," *IEEE Transactions on Power Electronics*, vol. 11, No. 2, pp. 275-284 (1996).

Koudriavtsev, O. et al., "Advanced Development of Voltage Source Soft-Switching High-Frequency Inverter for Silent Discharge Tube Loads," *Power Electronics and Motion Control Conference. Proceedings. IPEMC 2000. The Third International*, vol. 1, pp. 302-307 (2000).

Koudriavtsev, O. et al., "A Novel Pulse-Density-Modulated High-Frequency Inverter for Silent-Discharge-Type Ozonizer," *IEEE Transactions on Industry Applications*, vol. 38, No. 2, pp. 369-378 (2002).

Koudriavtsev, O. et al., "Power Supply for Silent Discharge Type Load," *Industry Applications Conference. Cconference Record of the 2000 IEEE*, vol. 1, pp. 581-587 (2000).

Martin, F.J.F. et al., "Analysis and Design of a High Power Factor, Single-Stage Electronic Ballast for High-Intensity Discharge Lamps," *IEEE Transactions on Power Electronics*, vol. 18, No. 2, pp. 558-569 (2003).

Martins, D.C. et al., "Treatment of the Solar Energy for a Water Pumping System Using a Current-Fed Parallel Resonant Push-Pull Inverter."

Ponce, M. et al., "An Efficient Integrated Electronic Ballast for Compact Fluorescent Lamps," *Power Electronics Specialists Conference. PESC. 2002 IEEE $33^{rd}$ Annual*, vol. 1, pp. 203-208 (2002).

Ribas, J. et al., "Analysis of Lamp-Ballast Interaction Using the Multi-Frequency-Averaging Technique," *Power Electronics Conference. PESC. 2001 IEEE 32 Annual*, vol. 1, pp. 176-181 (2001).

Ribas, J. et al., "Low-Cost Single-Stage Electronic Ballast Based on a Self-Oscillating Resonant Inverter Integrated with a Buck-Boost PFC Circuit," *IEEE Transactions on Industrial Electronics*, vol. 48, No. 6, pp. 1196-1204 (2001).

Rodriguez, F. et al., "Analysis and Design of the LCC-Parallel Series Inverter with Resonant Current Control as HPS Lamp Ballast," *Power Electronics Specialists Conference. PESC. 2001 IEEE $32^{nd}$ Annual*, vol. 2, pp. 980-985 (2001).

Stepanov, S.F. et al., "The Power Source for the Ozone Generator Experimental Research," *Actual Problems of Electron Devices Engineering. (APEDE 2002). Fifth International Conference*, pp. 311-315 (2002).

Teschke, M. et al., "Comparison of Parallel and Serial Resonance Circuits for Generation of Surface Barrier Discharges," *Proc. of XXVI International Conference on Phenomena in Ionized Gases ICPIG 2003*, vol. 4, Greifswald, Germany, pp. 59-60 (2003).

Teschke, M. et al., "Resonant, High Voltage, High Power Supply for Atmospheric Pressure Plasma Sources," *IEEE Power Electronics Specialists Conference, $35^{th}$ Annual*, pp. 835-839 (2004).

Wang, C., "A Soft-Switched Series-Resonant DC/AC Inverter Without Auxiliary Switches," *Power Electronics Specialists Conference. PESC. 2002 IEEE $33^{rd}$ Annual*, vol. 2, pp. 827-832 (2002).

Wang, S. et al., "A Novel Silent Discharge Type Ozonizer Using Pulse Density Modulated High-Frequency Inverter," *Industry Applications Conference. Thirty-Fourth IAS Annual Meeting. Conference Record*, vol. 2, pp. 764-772 (1999).

Yushui, H. et al., "Load Resonant Type Power Supply of the Ozonizer Based on a Closed-loop Control Strategy," *Applied Power Electronics Conference and Exposition. APEC'04. Nineteenth Annual IEEE*, vol. 3, pp. 1642-1646 (2004).

Alonso, J.M. et al., "Analysis, Design and Experimentation of a High Voltage Power Supply for Ozone Generation Based on the Current-Fed Parallel-Resonant Push-Pull Inverter," *Industry Applications Conference, $39^{th}$ LAS Annual Meeting*, pp. 2687-2693 (2004).

Kifune et al., "Novel Constant Frequency Time Ratio Controlled Series Load Resonant," $33^{rd}$ *Annual IEEE Power Electronics Specialists Conference*, pp. 1892-1897 (2202).

(56) References Cited

OTHER PUBLICATIONS

Yushui, H. et al., << Load Resonant Type Power Supply of the Ozonizer Based on a Closed-loop Control Strategy, *Applied Power Electronics Conference and Exposition*, pp. 1642-1646 (2004).
International Search Report for PCT/US2006/031664 (4 pgs.), mailed Feb. 21, 2007.
European Search Report Application No. 12174905.51804/2523336; dated Apr. 29, 2013; 8 pages.
Kifune, Hiroyasu et al.; Novel Constant Frequency Time Ratio controlled Series Load Resonant High Frequency soft Switching Inverter; IEEE; pp. 1892-1897; 2002.

\* cited by examiner

FIG. 1

PRIOR ART

POWER SUPPLY INCLUDING TRANSFORMER-LESS HIGH VOLTAGE POWER OSCILLATORS FOR OZONE GENERATION

RELATED APPLICATION

This application is a continuation of U.S. patent application Ser. No. 11/503,662 filed Aug. 14, 2006, which claims the benefit of and priority to U.S. Provisional Application No. 60/708,445, filed on Aug. 16, 2005, both of which are owned by the assignee of the instant application and the disclosures of which are incorporated herein by reference in their entireties.

BACKGROUND

Ozone is useful for numerous applications that require a high level of oxidation. For example, ozone is useful for disinfection of drinking water and has been used for water treatment since the early 1900s. More recently, ozone has been used for semiconductor device processing. One application for ozone in semiconductor device processing is forming insulating layers on semiconductor wafers by growing insulating films or by oxidizing thin films on the wafer. For example, high deposition rate chemical vapor deposition of high quality $SiO_2$ can be accomplished by using a TEOS/ozone process.

Another application for ozone in semiconductor device processing is for cleaning semiconductor wafers and the processing chambers of semiconductor processing equipment. Ozone is particularly useful for removing hydrocarbons from the surface of semiconductor wafers or from processing chambers. Using ozone for cleaning is advantageous because it avoids the use of dangerous chemicals which require costly disposal. In contrast, ozone does not present a toxic waste disposal problem because ozone decays to oxygen without residues.

SUMMARY

Ozone can be generated from oxygen according to a so-called "silent discharge principle." For instance, ozone can be generated by exposing high purity oxygen to an electrical discharge or an electrical flux. The discharge or flux excites the oxygen molecules, breaking them into their atomic state. The atoms then recombine into a mixture of ozone ($O_3$) and oxygen ($O_2$).

Ozone ($O_3$) is typically produced by passing oxygen through an ozone cell where it is acted upon by an electrical discharge causing the dissolution and recombination of the oxygen atoms into ozone molecules. The electrical discharge or electrical flux needed for ozone generation is produced by applying a high voltage AC power across opposing plates of the ozone cell. The high voltage AC power is produced from transformer-based power oscillators.

Disadvantages of a transformer-based power supply (an oscillator) typically include high cost, limited reliability, and limited range of operation. For example, the high cost is typically due to the high-voltage transformer with multiple windings and special potting requirements for cooling and insulation. Limited reliability is typically due to the topology of the self-oscillator, high voltage corona caused by the dependence of the potting quality, and use of single source unique parts. Limited range of operation with respect to the regulated output voltage is typically due to the self-oscillator topology and use of transformer feedback for the transistor's gate drive.

The present invention is directed to a method and apparatus for supplying power using a power supply including transformer-less high voltage power oscillators for ozone generation. Embodiments of the present invention can reduce cost, increase reliability and operation range of ozone generators.

One embodiment includes a power supply having a power source and a resonant circuit coupled to the power source, the power source providing a first AC voltage to the resonant circuit, the resonant circuit providing a second AC voltage for use by an ozone generating unit, the second AC voltage being greater than the first AC voltage. The resonant circuit can apply a substantially resonant voltage to the ozone generating unit in response to the first AC voltage having a frequency substantially close to the resonant frequency of the resonant circuit.

In some embodiments, the resonant circuit can be a series resonant circuit including a resonant inductor coupled in series with a resonant capacitor. The resonant capacitor can be an individual capacitor, a natural capacitance of the ozone generating unit, or a combination of both an individual capacitor and natural capacitance of the ozone generating unit. The resonant circuit has a q-factor greater than or equal to 10. In other embodiments, the resonant circuit can be a parallel resonant circuit including a resonant inductor coupled in parallel with a resonant capacitor. The resonant capacitor can be an individual capacitor, a natural capacitance of the ozone generating unit, or a combination of both an individual capacitor and natural capacitance of the ozone generating unit.

The power source can be a half bridge inverter, a full bridge inverter, and/or a switching power source. The switching elements can be MOSFETs, BJTs, IGBTs, and/or any other type of switching elements.

The power supply can further include a controller providing signals to the power source that cause the power source to modulate the first AC voltage, resulting in the second AC voltage having a desired voltage magnitude. The first AC voltage can be modulated using pulse width modulation and/or frequency modulation. The controller can provide signals to the power source that allows the resonant circuit to operate at its maximum operating resonant frequency. The controller can tune to the maximum operating frequency of the resonant circuit by comparing a sensed input DC current to a set point input current. The controller can control a resonant voltage of the ozone generating unit during self-tuning to the maximum operating frequency of the resonant circuit by comparing a sensed resonant current to a set point resonant current.

Embodiments of the invention also include a power supply for ozone generation. Other embodiments of the invention may be applied for supplying power for generation of any reactive gases.

Advantages of the embodiments of the invention include reduced cost and increased reliability and operation range of ozone generators by eliminating the need for a transformer.

Using a high Q resonant circuit (Q≥10 typically for an ozone generator) instead of a transformer implies that the circuit resonant frequency peak is narrow. Since its center frequency depends on circuit elements with tolerances often wider than the resonance peak width, control of such a circuit can be a problem. A circuit to control high Q resonant circuits allows realization of the advantages above in both ozone generators and in resonant power supplies for other applications.

BRIEF DESCRIPTIONS OF THE DRAWINGS

The foregoing and other objects, features and advantages of the invention will be apparent from the following more particular description of preferred embodiments of the invention. The drawings are not necessarily to scale, emphasis instead being placed upon illustrating the principles of the invention.

DETAILED DESCRIPTION

Figure 1:
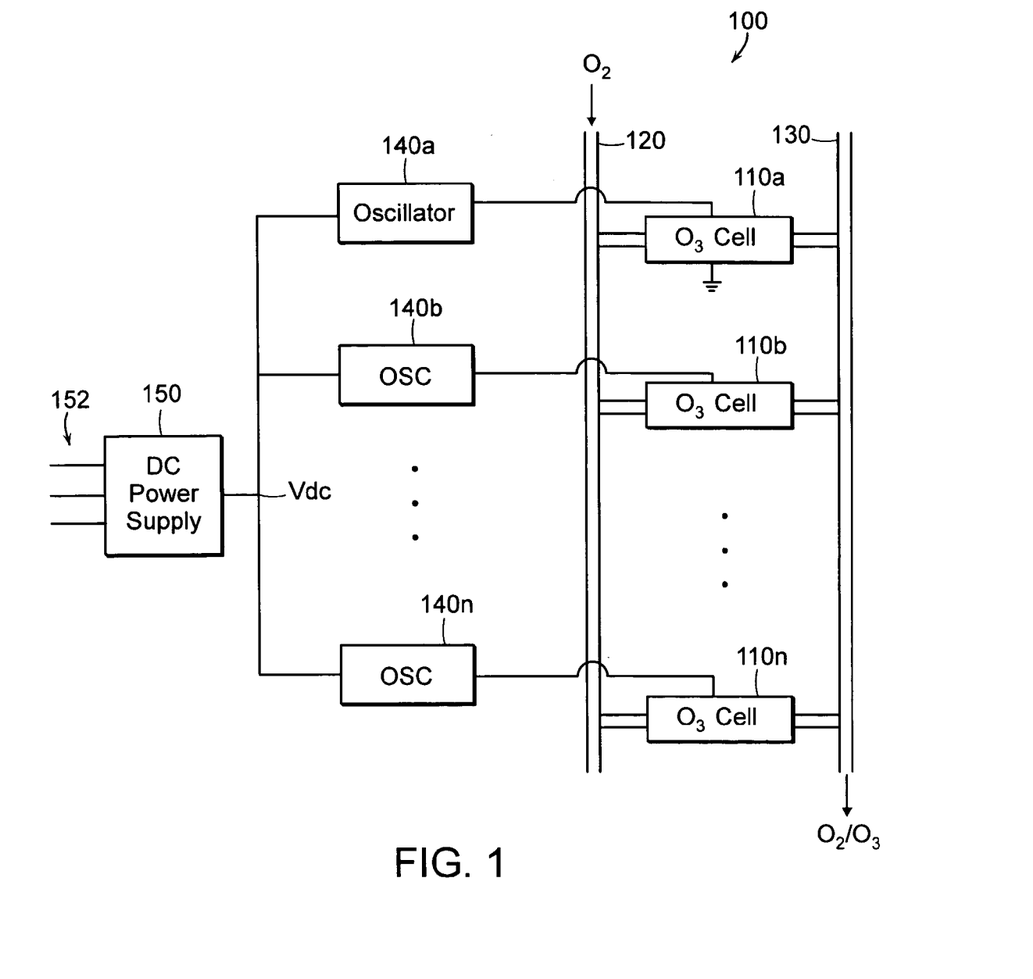
FIG. 1 is a diagram illustrating a typical ozone generator.

FIG. 1 is a diagram illustrating a typical ozone generator 100. The ozone generator 100 includes a bank of ozone generating units, referred to herein as ozone cells 110a ... 110n. Oxygen ($O_2$) is supplied to each ozone cell 110 through an oxygen inlet 120 for conversion into a mixture of ozone ($O_3$) and oxygen ($O_2$). The resulting ozone mixture flows out of the ozone generator 100 through an ozone outlet 130.

Components of the ozone cell 110 typically include opposing electrode plates (not shown) and a dielectric barrier (not shown). The dielectric barrier is positioned against one of the electrode plates, forming a channel between the dielectric barrier and the opposing electrode plate. In operation, oxygen ($O_2$) passing through the channel is acted upon by an electrical discharge causing the dissolution and recombination of the oxygen atoms into ozone molecules. To cause the electrical discharge or flux, high voltage AC power is applied across the opposing electrode plates of each ozone cell 110.

The high voltage AC power is provided by a bank of power oscillators 140a ... 140n with each oscillator 140 supplying power to a respective ozone cell 110. The power oscillators 140 are coupled to a common DC power supply 150 that can convert single-phase or three-phase AC line voltage 152 into a regulated DC voltage (Vdc). Each oscillator 140, in turn, converts the regulated DC voltage (Vdc) into high voltage AC power that is supplied to a corresponding/respective ozone cell 110, resulting in the electrical discharge or electrical flux needed for ozone generation. An exemplary embodiment of the ozone cell 110 can be found in U.S. Pat. No. 5,932,180, the entire contents of which are incorporated herein by reference.

Figure 2:
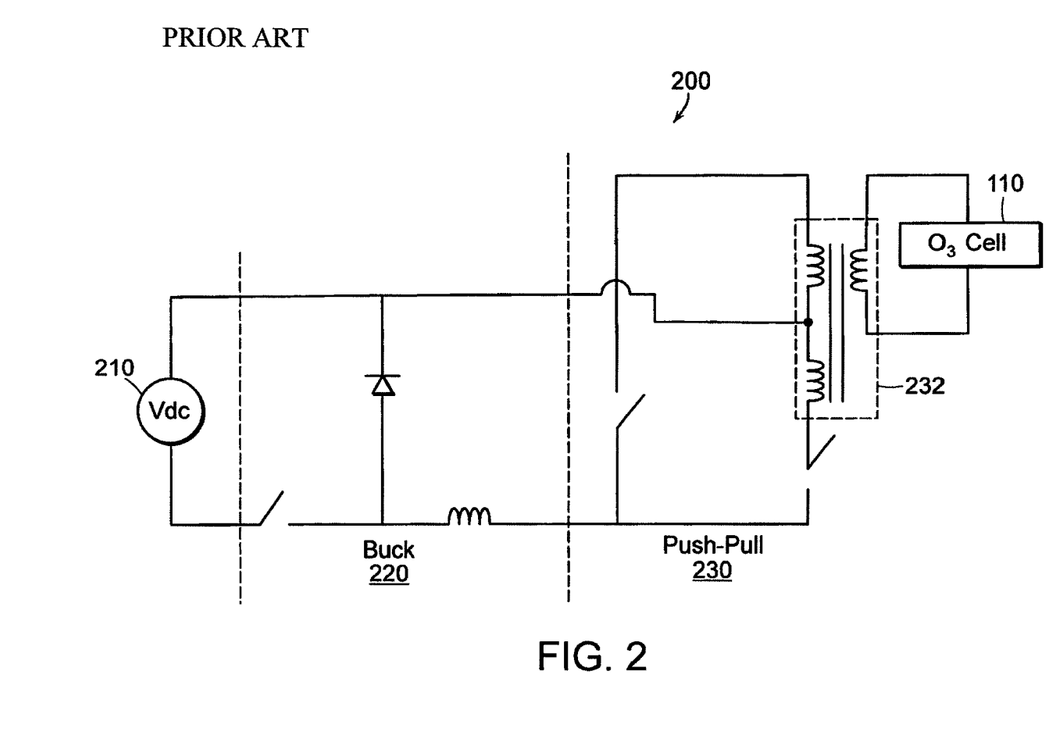
FIG. 2 is a diagram that illustrates a transformer-based power supply used in an ozone generator according to the prior art.

Generally, the power oscillators 140 are implemented using transformers to generate high voltage AC power. FIG. 2 is a diagram that illustrates a transformer-based power supply 200 used in an ozone generator according to the prior art. The illustrated power supply 200 consists of a DC power supply 210 and two additional stages: (1) a buck converter 220 for regulation of output power and (2) a self oscillating push-pull converter 230 that includes a transformer 232 to generate the high voltage AC power across the ozone cell 110.

Figure 3:
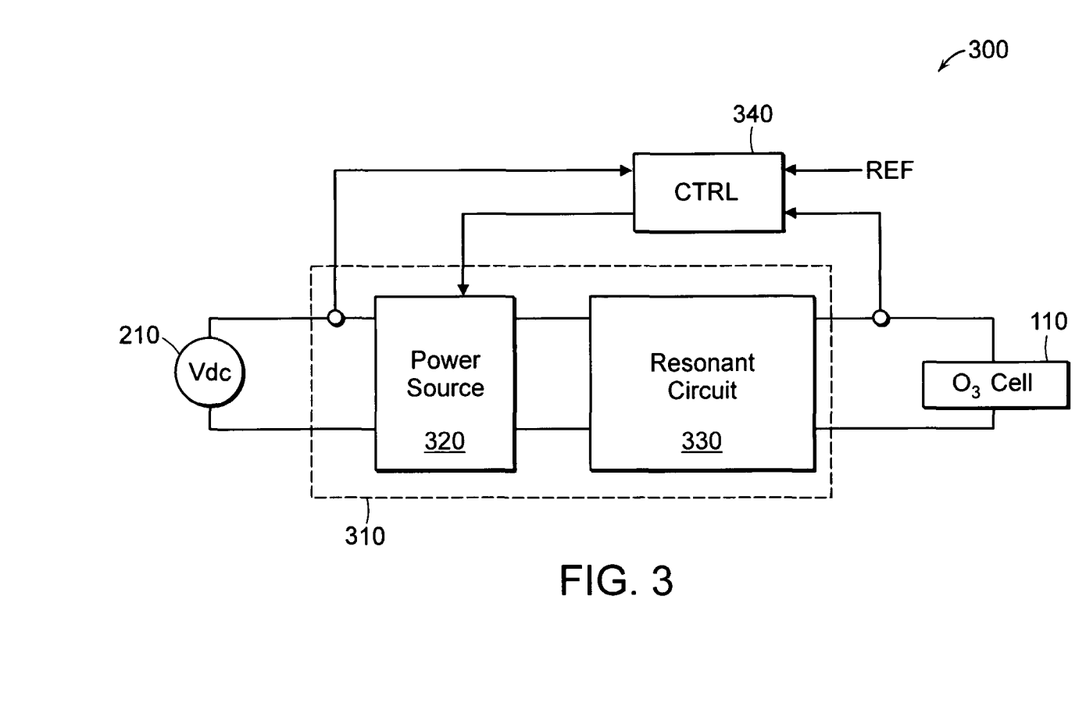
FIG. 3 is a diagram illustrating a power supply having a transformer-less power oscillator for ozone generation in a single ozone cell according to one embodiment.

FIG. 3 is a diagram illustrating a power supply 300 having a transformer-less power oscillator 310 for ozone generation in a single ozone cell 110 according to one embodiment. The power oscillator 310 includes a power source 320 coupled to a resonant circuit 330. The resonant circuit 330 is coupled, in turn, to the ozone cell 110. The power source 320 can be a switching power source.

In operation, the power source 320 converts a regulated DC voltage (Vdc) from a DC voltage source 210 into a first AC voltage that is supplied to the resonant circuit 330. Preferably, the first AC voltage from the power source 320 has a frequency substantially close to the resonant frequency of the resonant circuit 330. In response, the resonant circuit 330 applies a substantially resonant second AC voltage to the ozone cell 110 causing an electrical discharge or flux within the ozone cell 110. Thus, by coupling the resonant circuit 330 to the power source 320, the power supply 300 is able to provide high voltage AC power (a second AC voltage) needed for ozone generation in the ozone cell 110 without the use of a transformer.

With reference to FIG. 3, a controller 340 provides control signals to the power source 320 that cause the power source 320 to modulate the frequency and/or duty cycle of the first AC voltage resulting in the resonant circuit 330 providing a substantially second AC resonant voltage having a desired magnitude to the ozone cell 110. In some embodiments the second resonant AC voltage can be 4.5 kVpk at 30 kHz.

In operation, the controller 340 compares a reference current REF with a sensed input current at the power source 320 and sends control signals (gate control signals) to the power source 320 to make adjustments to the operating frequency or duty cycle of the power source 320 to obtain the desired magnitude. The first AC voltage can be modulated by the controller 340 using pulse-width modulation and/or frequency modulation. In some embodiments, the controller 340 can be configured to sense voltage, current, or a combination thereof to determine and control the desired resonant voltage.

Figure 4:
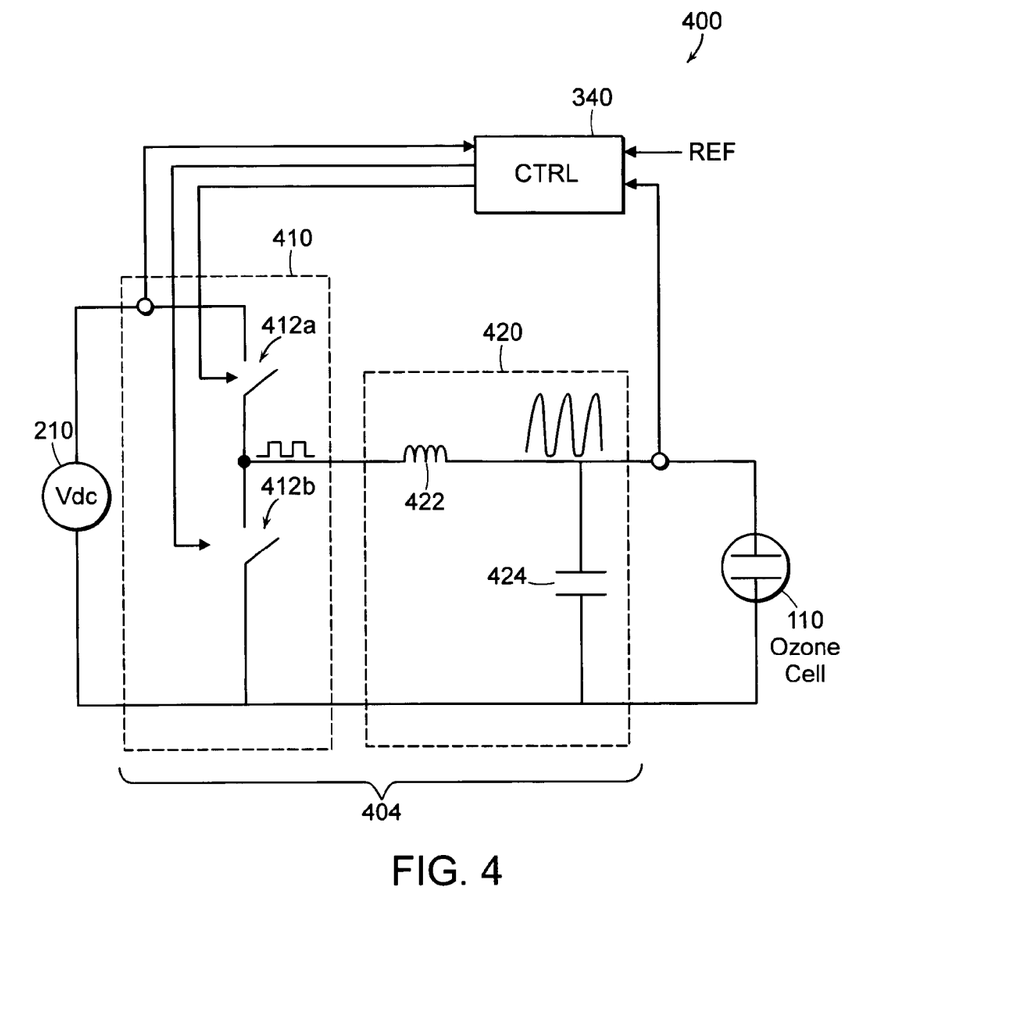
FIG. 4 is a diagram illustrating a power supply having a transformer-less power oscillator for ozone generation in a single ozone cell according to a particular embodiment.
Figure 8A:
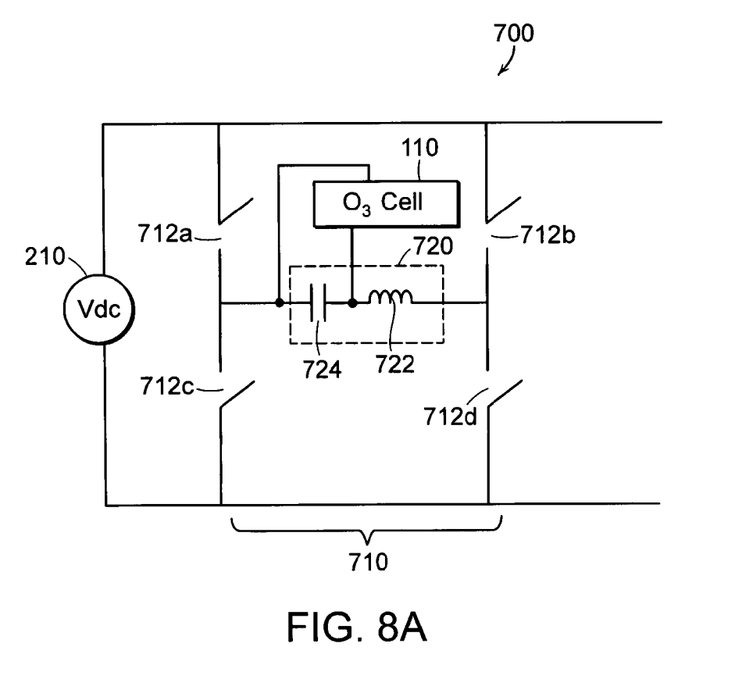
FIGS. 8A and 8B are diagrams illustrating a power supply having a transformer-less power oscillator for ozone generation in a single ozone cell according to other particular embodiments.
Figure 8B:
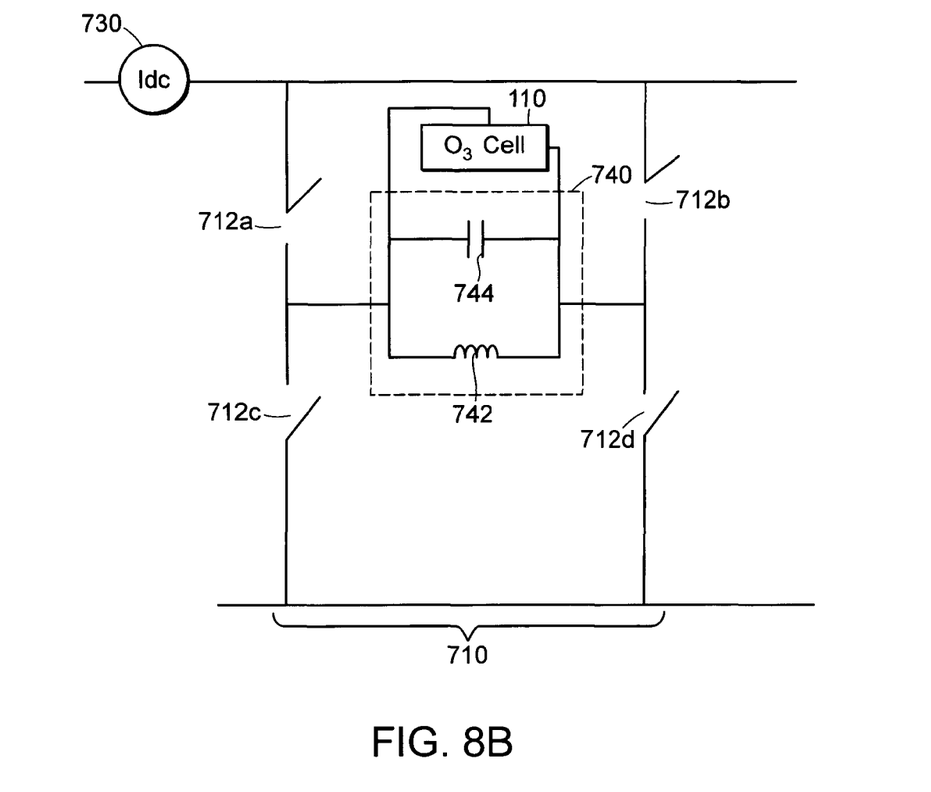

FIG. 4 is a diagram illustrating a power supply 400 having a transformer-less power oscillator 404 for ozone generation in a single ozone cell 110 according to a particular embodiment. In the illustrated embodiment, the resonant circuit 420 is a series resonant circuit including a resonant inductor 422 coupled in series with a resonant capacitor 424 The ozone cell 110 is coupled in parallel with the resonant capacitor 424. The resonant capacitor 424 can be a separate individual capacitor, the natural capacitance of the ozone cell 110, or a combination thereof. In the illustrated embodiment, the power source 410 is a half bridge inverter including two switching elements 412a, 412b connected in series. The switching elements 412a, 412b can be MOSFETs, BJTs, IGBTs and/or any other type switching elements known in the art. The electrical connection between the switching elements 412a, 412b is connected to the resonant circuit 420. The power source 410 can also be a full bridge inverter as shown in FIGS. 8A and 8B.

In operation, a DC power supply 210 supplies a regulated DC voltage (Vdc) to the power source/half bridge inverter 410. Control signals from the controller 340 are provided to a gate driver 540 (FIGS. 5A and 5B) that causes the switches 412a, 412b to turn on and off resulting in the half bridge inverter 410 supplying the first AC voltage having a frequency substantially close to the resonant frequency of the series resonant circuit 420. Particularly, the first AC voltage applied to the resonant circuit 420 can be square wave pulses with a controlled duty cycle. The control signals can also change the duty cycle of the half bridge inverter 410 to alter the magnitude of the second resonant AC voltage applied to the ozone cell 110. In response to receiving the first AC voltage from the half bridge inverter 410, the series resonant circuit 420 provides a resonant or substantially second resonant AC voltage across the ozone cell 110 such that an electrical discharge or flux is provided within the cell to effect conversion of oxygen ($O_2$) to ozone ($O_3$). Particularly, the resonant circuit 420 converts the applied square wave pulses with a controlled duty cycle to a high voltage sine wave of controlled amplitude. According to one embodiment, the frequency and magnitude of the second resonant AC voltage is approximately 4.5 kVpk at 30 kHz.

The ratio of ozone ($O_3$) to oxygen ($O_2$) depends on the amount of power supplied to the ozone cells 110. The power applied to the ozone cell 110 increases in proportion to the voltage applied to the ozone cell 110 and is regulated by the controller 340 in accordance with the reference signal REF as described above. Thus, by changing the operating frequency or duty cycle of the half bridge inverter 410, the controller 340 can alter the concentration of ozone. Further, the resonant frequency changes with even a small variation in inductance and capacitance. Thus, the resonant circuit 420 should have a high Q factor (greater than or equal to 10) to eliminate the need for transformer. Therefore, the controller 340 should be independent of the resonant component variation.

Figure 5A:
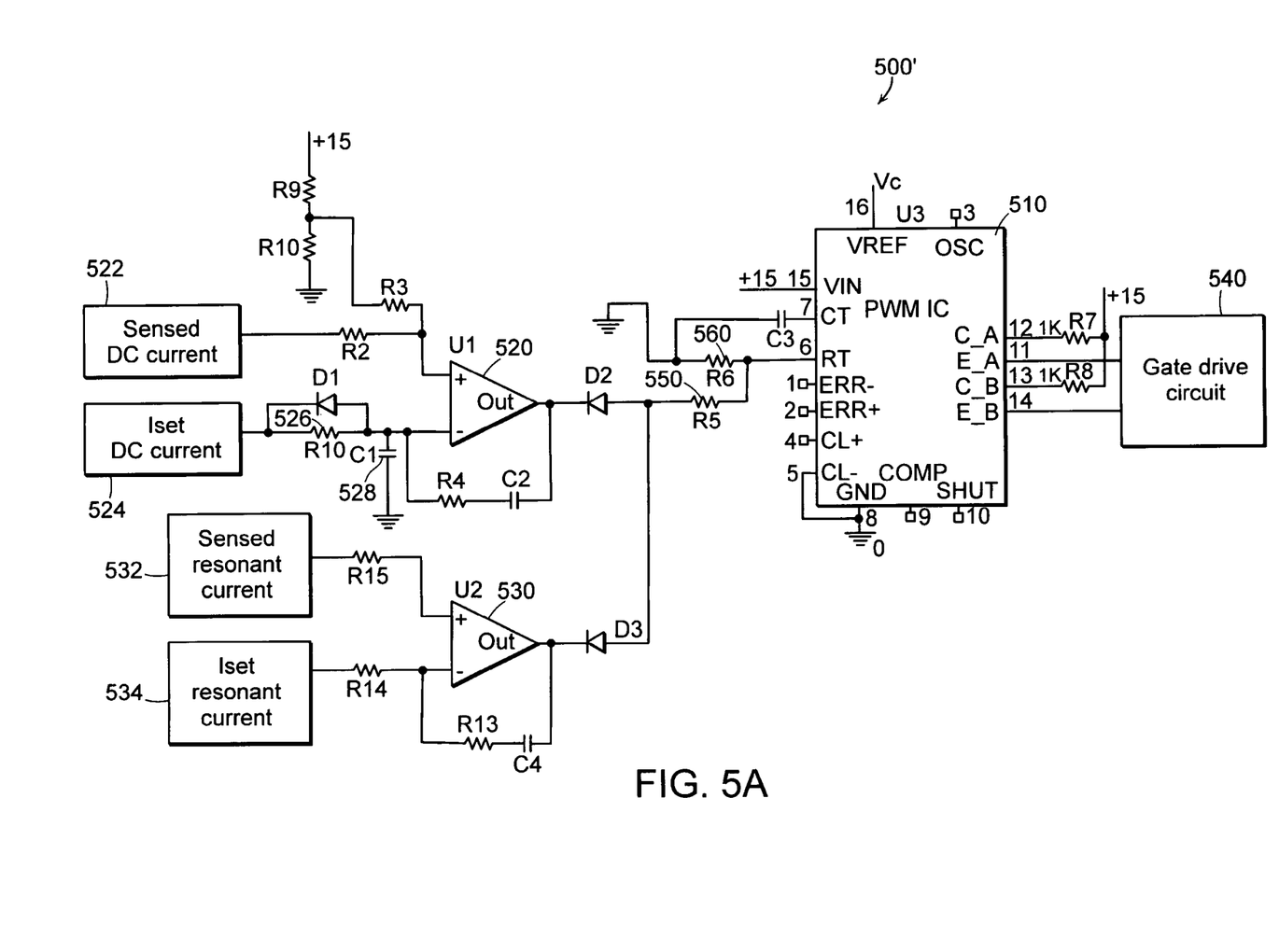
FIG. 5A shows a detailed schematic of one embodiment of a frequency modulation controller.
Figure 5B:
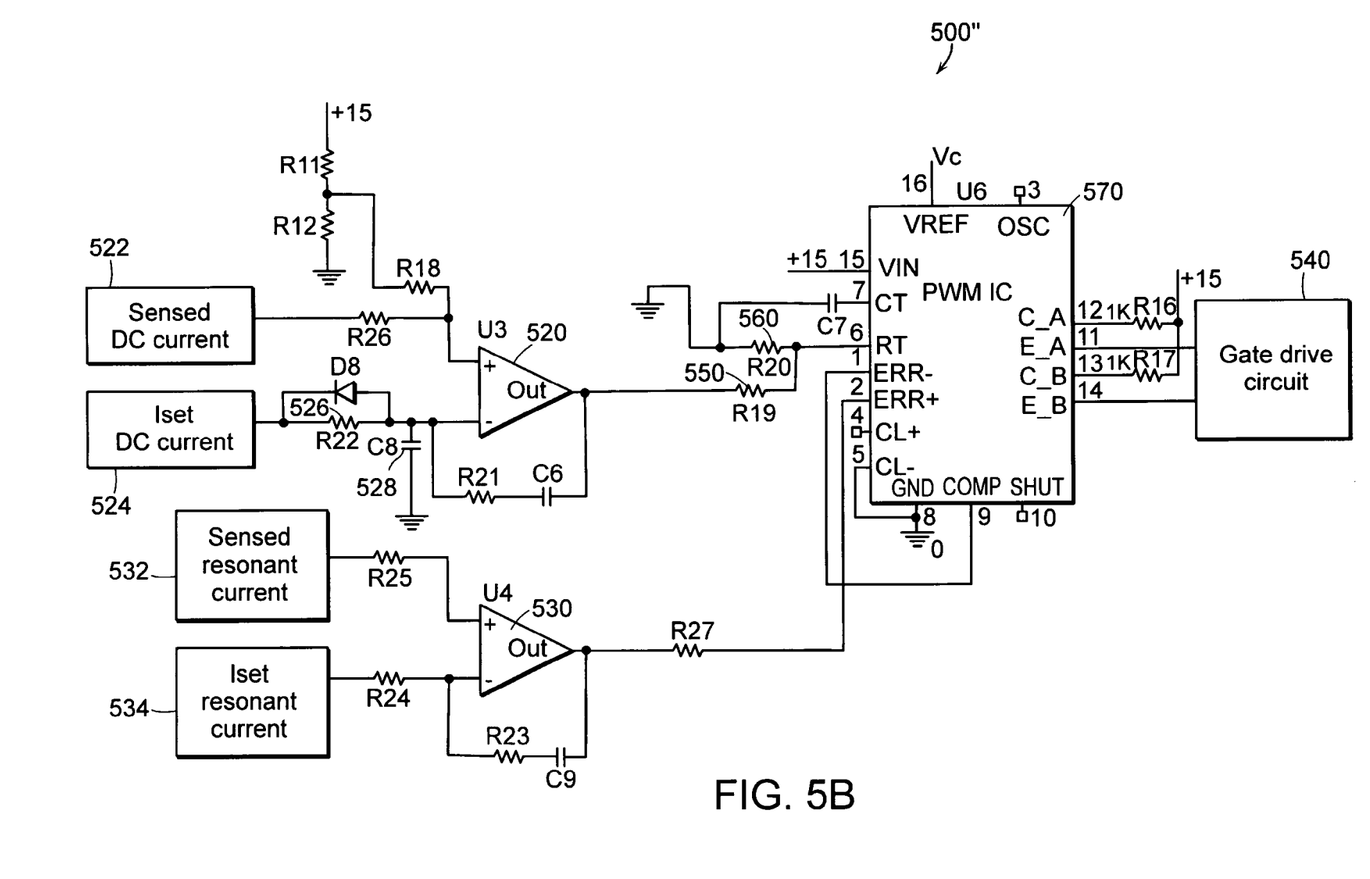
FIG. 5B shows a detailed schematic of one embodiment of a pulse-width modulation controller.

FIGS. 5A and 5B show a detailed schematic of embodiments of a controller 500. The major components of the controller 500 include a pulse-width modulated integrated circuit (PWM IC) 510, a first operational/error amplifier 520, a second operational/error amplifier 530, a gate driver circuit 540, a first resistor 550, and a second resistor 560.

FIG. 5A shows one embodiment of a frequency modulated controller 500'. In operation, the operational amplifier/error amplifier 520 compares the sensed DC input current 522 with the set point DC current 524. The resistors 550, 560 control the frequency of the PWM IC 510. The output of the error amplifier 520 controls the current flowing through the resistor 550 by pulling it up or down and thus controls the frequency of the controller 510. The controller 500' includes an auto tuning circuit that ensures the initial frequency generated by the error amplifier 520 is the maximum operating frequency of the resonant circuit 420 (FIG. 4).

The tuning circuit includes a resistor 526, a capacitor 528, and a small offset voltage at the sensed input of the error amplifier 520. In operation, when the tuning circuit powers up, the DC current set point 524 slowly increases from zero to its set point through a delay created by the resistor 526 and capacitor 528. In that time, the offset voltage at the error amplifier 520 ensures that the frequency generated by the error amplifier is the maximum operating frequency of the circuit. The maximum resonant frequency is determined by considering the maximum tolerance on the resonant circuit elements and the capacity of the switching devices.

Figure 6:
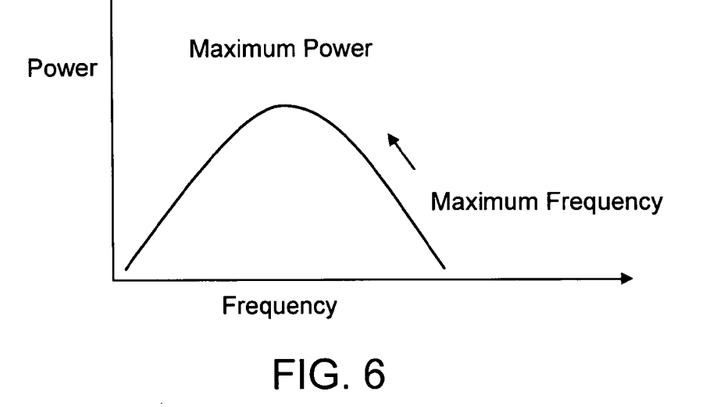
FIG. 6 shows a graph showing the relationship between set point power and resonant frequency.

FIG. 6 shows a graph showing the relationship between the set point power and the resonant frequency. As shown, as the set point power increases, the pulse-width modulation frequency starts reducing from its maximum value toward maximum power. That is, pulse-width modulation frequency walks over the resonant curve to achieve the maximum power.

It is important to control the ozone cell 110 voltage because the ozone cell 110 voltage can rise to a very high voltage during auto-tuning of the frequency for maximum power. Thus, the controller 500' includes a second operational amplifier/error amplifier 530. The error amplifier 530 controls the resonant voltage of the ozone cell 110 by comparing the sensed resonant current 532 to the set point resonant current 534.

The resonant current can also be controlled by using pulse-width modulation. FIG. 5B shows one embodiment of a pulse-width modulation controller 500". The operation of the pulse-width modulation controller 500" is similar to the operation with respect to the frequency modulated controller 500' as described above.

Figure 7:
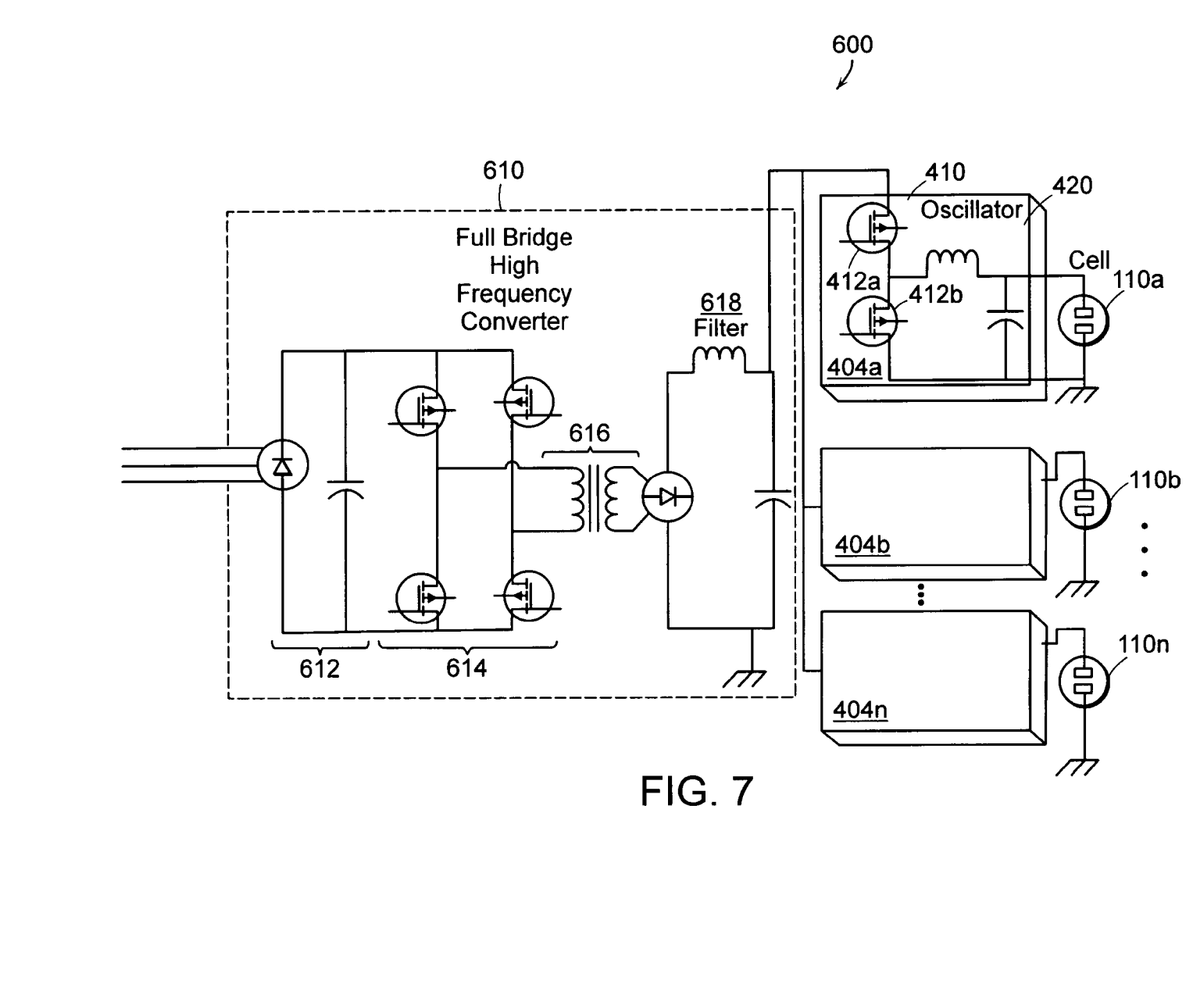
FIG. 7 is a diagram illustrating a power supply having multiple transformer-less power oscillators for ozone generation across multiple ozone cells according to one embodiment.

FIG. 7 is a diagram illustrating a power supply 600 having multiple transformer-less power oscillators 404a . . . 404n for ozone generation across multiple ozone cells 110a . . . 110n according to one embodiment. In the illustrated embodiment, the regulated DC voltage (Vdc) (e.g. approximately 400V) is provided by a known full bridge high frequency converter 610. The high frequency converter 610 includes a rectifier stage 612, a full bridge switching stage 614, a transformer stage 616, and a filter stage 618. Other circuits known to those skilled in the art can also be implemented to provide the regulated DC voltage. The power oscillators 404a . . . 404n are coupled to a corresponding/respective ozone cell 110a . . . 110n to provide the high voltage AC power. Each oscillator 404 includes a power source 410 coupled to a resonant circuit 420. In the illustrated embodiment, the power sources 410 are half bridge inverters implemented using MOSFET switching devices 412a, 412b. Other switching devices known to those skilled in the art may also be utilized. Also, mixed implementations of half-bridge oscillators, full-bridge oscillators, and other known devices may be employed. The operation of the illustrated embodiment is similar to the operation described with respect to FIGS. 1 and 4.

FIGS. 8A and 8B are diagrams illustrating a power supply 700 having a transformer-less power oscillator for ozone generation in a single ozone cell 110 according to other particular embodiments. In both embodiments, the power source 710 is implemented as a full bridge converter with four switching elements 712a, 712b, 712c, 712d coupled as shown.

As shown in FIG. 8A, a voltage supply 210 supplies regulated DC voltage (Vdc) to the full bridge converter 710. The full bridge converter 710 is coupled to a series resonant circuit 720 having a resonant inductor 722 coupled in series with a resonant capacitor 724. The resonant circuit 720 is coupled, in turn, to an ozone cell 110 as shown.

As shown in FIG. 8B, a current supply 730 supplies a regulated DC current (Idc) to the full bridge converter 710. The full bridge converter 710 is coupled to a parallel resonant circuit 740 having a resonant inductor 742 coupled in parallel to a resonant capacitor 744. The resonant circuit 740 is coupled, in turn, to an ozone cell 110 as shown.

In either embodiment, the resonant capacitor can be a separate individual capacitor or can be the natural capacitance of the ozone cell 110 or combination of both an individual capacitor and natural capacitance of the cell.

While this invention has been particularly shown and described with references to preferred embodiments thereof, it will be understood by those skilled in the art that various changes in form and details may be made therein without departing from the scope of the invention encompassed by the appended claims.

What is claimed:

1. A power supply for ozone generation, comprising:
   a transformer-less oscillator comprising a power source and a series resonant circuit;

the series resonant circuit having a q-factor and being directly coupled between the power source and an ozone generating unit, where the q-factor is greater than or equal to 10, the series resonant circuit including a resonant inductor coupled in series with a resonant capacitor; and the power source being configured to providing a first AC voltage to the resonant circuit, and the resonant circuit being configured to providing a second AC voltage to the ozone generating unit, the second AC voltage being greater than the first AC voltage and sufficient to power the ozone generating unit.

2. The power supply of claim 1, wherein the series resonant circuit applies a substantially resonant voltage to the ozone generating unit in response to the first AC voltage having a frequency substantially close to a resonant frequency of the series resonant circuit.

3. The power supply of claim 1, wherein the resonant capacitor is:
an individual capacitor, a natural capacitance of the ozone generating unit, or a combination of both an individual capacitor and natural capacitance of the ozone generating unit.

4. The power supply of claim 1, wherein the power source is a half-bridge inverter or a full-bridge inverter.

5. The power supply of claim 1, further comprising:
a controller providing signals to the power source that cause the power source to modulate the first AC voltage, resulting in the second AC voltage having a desired voltage magnitude.

6. The power supply of claim 5, wherein the first AC voltage is modulated using pulse width modulation.

7. The power supply of claim 5, wherein the first AC voltage is modulated using frequency modulation.

8. The power supply of claim 5, wherein the controller provides signals to the power source that allows the series resonant circuit to operate at or near its resonant frequency.

9. The power supply of claim 8, wherein the controller tunes to the maximum operating frequency of the series resonant circuit and approaches the resonant frequency of the circuit to obtain the desired operating level, by comparing a sensed input DC current to a set point input current.

10. The power supply of claim 9, wherein the controller controls a resonant voltage of the ozone generating unit during self-tuning to the maximum operating frequency of the series resonant circuit and approaches the resonant frequency of the circuit by comparing a sensed resonant current to a set point resonant current.

11. A power supply for ozone generation, comprising:
a transformer-less oscillator comprising a power source and a parallel resonant circuit;
the resonant circuit having a q-factor and being directly coupled between the power source and an ozone generating unit, where the q-factor is greater than or equal to 10, the parallel resonant circuit including a resonant inductor coupled in parallel with a resonant capacitor; and the power source being configured to providing a first AC voltage to the resonant circuit, and the resonant circuit being configured to providing a second AC voltage to the ozone generating unit, the second AC voltage being greater than the first AC voltage and sufficient to power the ozone generating unit.

12. The power supply of claim 11, wherein the resonant circuit applies a substantially resonant voltage to the ozone generating unit in response to the first AC voltage having a frequency substantially close to a resonant frequency of the resonant circuit.

13. The power supply of claim 11, wherein the resonant capacitor is:
an individual capacitor, a natural capacitance of the ozone generating unit, or a combination of both an individual capacitor and natural capacitance of the ozone generating unit.

14. The power supply of claim 11, wherein the power source is a half-bridge inverter or a full-bridge inverter.

15. The power supply of claim 11, further comprising:
a controller providing signals to the power source that cause the power source to modulate the first AC voltage, resulting in the second AC voltage having a desired voltage magnitude.

16. The power supply of claim 15, wherein the first AC voltage is modulated using pulse width modulation.

17. The power supply of claim 15, wherein the first AC voltage is modulated using frequency modulation.

18. The power supply of claim 15, wherein the controller provides signals to the power source that allows the resonant circuit to operate at or near its resonant frequency.

19. The power supply of claim 18, wherein the controller tunes to the maximum operating frequency of the resonant circuit and approaches the resonant frequency of the circuit to obtain the desired operating level, by comparing a sensed input DC current to a set point input current.

20. The power supply of claim 19, wherein the controller controls a resonant voltage of the ozone generating unit during self-tuning to the maximum operating frequency of the resonant circuit and approaches the resonant frequency of the circuit by comparing a sensed resonant current to a set point resonant current.

* * * * *